Jan. 5, 1932.　　　A. J. LOEPSINGER　　　1,839,884

FRANGIBLE VESSEL AND METHOD OF MAKING THE SAME

Filed Aug. 27, 1929

Inventor
Albert J. Loepsinger
by Harry Dexter Peck
Attorney

Patented Jan. 5, 1932

1,839,884

UNITED STATES PATENT OFFICE

ALBERT J. LOEPSINGER, OF PROVIDENCE, RHODE ISLAND, ASSIGNOR TO GENERAL FIRE EXTINGUISHER COMPANY, OF PROVIDENCE, RHODE ISLAND, A CORPORATION OF DELAWARE

FRANGIBLE VESSEL AND METHOD OF MAKING THE SAME

Application filed August 27, 1929. Serial No. 388,714.

This invention relates to improvements in frangible vessels and methods of making the same. More particularly it has to do with such vessels made of glass which are intended to contain a bursting charge that completely shatters the vessel when heated to a predetermined degree.

Vessels of the sort described would be particularly useful as the sensitive or operative element of a sprinkler head but as heretofore made of glass have not proven entirely satisfactory for the purposes stated, because of cooling stresses set up in the vessel at the time the charge is sealed therein. The vessel may be formed of molten glass, with a neck or stem having a small opening for the introduction of the fracturing material, and may thereafter be annealed to eliminate internal stresses. When the bursting charge has been added however, the body of the vessel must be maintained at a temperature well below the operating degree, while the neck or stem is highly heated so that it may fuse and seal. This unequal heating of the vessel and subsequent cooling sets up internal stresses that render the vessel liable to premature fracture and unfit for use.

It is an object of this invention to provide glass vessels with tubes made from a material whose coefficient of expansion is approximately that of glass. This tube is inserted in the vessel when the latter is cast or molded and binds itself to the glass when the latter is molten. Because both the tube and glass have substantially the same expansive and contractive characteristics, the vessel with tube can be thoroughly annealed so as to eliminate internal stresses in the glass. After the bursting charge is introduced, the tube alone can be satisfactorily sealed without any disturbance of the glass. In consequence the then sealed vessel is free from internal stresses and will maintain its integrity until completely shattered by the bursting charge.

It is intended that the patent shall cover by suitable expression in the appended claims whatever features of patentable novelty exist in the invention disclosed.

Figure 1:
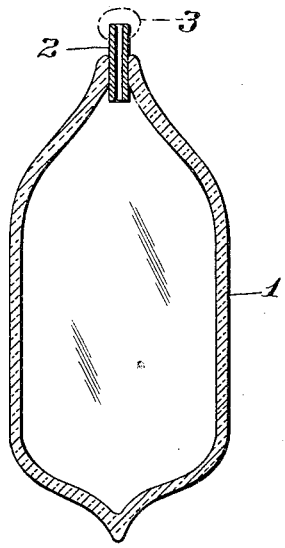
Figure 1 is a medial cross section of a vessel with tube, constructed in accordance with the principles of this invention.

Referring to the drawings the vessel 1 is formed of molten glass in the customary manner of making glass containers. A tube 2 of suitable material, such as platinum, which has a coefficient of expansion approximating that of the glass is placed in one end of the vessel while the glass is still in molten state. The tube of course extends completely through the wall of the vessel and may in fact project into the hollow of the vessel. It also extends outside the vessel, a sixteenth of an inch having been found to be a convenient length although no specific length is required. The vessel, with tube inserted as described, is then thoroughly annealed to remove all internal stresses from the glass. When finally cooled there is a strong bond between the glass and the tube.

Figure 2:
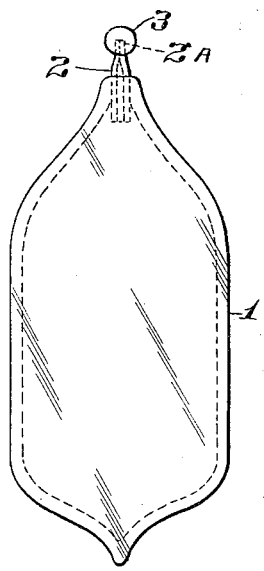
Figure 2 is an elevation of the same showing one kind of sealing.
Figure 3:
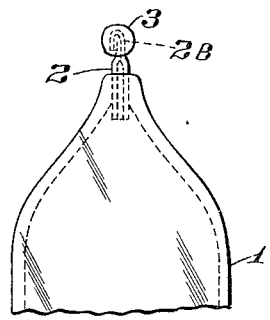
Figure 3 is another elevation showing a slightly modified form of sealing.

The vessel is then dropped in the liquid which is to constitute the bursting charge and the container holding the liquid and vessel is placed in a chamber in which a vacuum can be established. This draws the air from the vessel so that upon breaking the vacuum the liquid will flow into the vessel and completely fill it. The vessel is then heated to a predetermined temperature, corresponding to the degree of temperature at which the vessel is ultimately to be destroyed, and part of the liquid is driven out. The vessel and its charge are then permitted to cool thus insuring that there will be a definite space in the vessel not occupied by the liquid. After this the tube can be sealed with a drop or so of suitable solder 3 placed about its exposed end. If preferred the exposed end of the tube, before being soldered, can be pinched to substantially close its passage as indicated at 2a in Figure 2 and the squeezed or flattened portion can be bent back on itself as indicated at 2b in Figure 3. Such pinching and bending would prevent the escape of any vapor from its liquid contents while waiting for the solder to be applied.

I claim:

1. The method of making a charged vessel which comprises forming a vessel of frangible material with a tube extending through its wall made of material having a coefficient of expansion approximating that of the frangible material; introducing into the vessel a charge which upon increase of temperature imposes an increasing internal pressure which upon attaining a predetermined intensity destroys the vessel; followed by a sealing of the exposed end of the tube.

2. The method of making a vessel which comprises forming a vessel of frangible material with a tube extending through its wall made of material having a coefficient of expansion approximating that of a frangible material; exhausting the air from said vessel and introducing therein a bursting charge; subjecting said charged vessel to a cooling temperature and while thus cooled, sealing the exposed end of the tube.

3. The method of making a vessel which comprises forming a vessel of frangible material with a tube extending through its wall made of material having a coefficient of expansion approximating that of the frangible material; exhausting the air from said vessel and then introducing a charge of liquid therein; heating said vessel and contents to a predetermined temperature; followed by a cooling of the charged vessel and a sealing of the exposed end of the tube.

4. A vessel made of glass having its walls closed except for a single opening; a tube filling said opening made of metal having a coefficient of expansion approximating that of the vessel and having its exposed end sealed; said vessel containing a charge adapted upon being heated to increase the internal pressure on the vessel and at a predetermined degree to destroy said vessel.

5. The method of making a charged vessel which comprises forming a vessel of frangible material with a tube extending through its wall; introducing into said vessel a fluid charge adapted upon being heated to a pretermined degree to destroy said vessel; and then sealing the exposed end of the tube.

6. A closed vessel made of frangible material having an opening through its wall and a metallic tube in said opening having its exposed end sealed; the said vessel containing a fluid adapted upon being heated to destroy the vessel.

7. A charged vessel having a frangible wall with an opening therethrough closed by a sealed tube and containing a fluid adapted upon being heated to a predetermined degree to destroy said vessel.

8. The method of making a charged vessel which comprises forming a vessel of frangible material, sealing a tube through the wall of the vessel, annealing the vessel to eliminate internal stresses in the frangible material, introducing a charge through said tube and sealing the exposed end of the tube.

9. A charged vessel made of annealed frangible material having a closed tube sealed in the wall thereof; said vessel containing a charge adapted upon rise in temperature to increase the internal pressure on the vessel and at a predetermined temperature effect the destruction of the vessel.

Signed at Providence, Rhode Island, this 13th day of August, 1929.

ALBERT J. LOEPSINGER.